United States Patent
Tokuda

(10) Patent No.: US 8,548,473 B2
(45) Date of Patent: Oct. 1, 2013

(54) WIRELESS TERMINAL DEVICE TO SELECTIVELY SWITCH AMONG COMMUNICATION SYSTEMS TO PROVIDE OVERLAP FOR PERFORMING COMMUNICATION

(75) Inventor: Takeyuki Tokuda, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/530,643

(22) Filed: Jun. 22, 2012

(65) Prior Publication Data

US 2012/0329452 A1 Dec. 27, 2012

(51) Int. Cl.
*H04W 36/00* (2009.01)

(52) U.S. Cl.
USPC .................. 455/436; 455/443; 455/456.1

(58) Field of Classification Search
None
See application file for complete search history.

(56) References Cited

U.S. PATENT DOCUMENTS

| | | | |
|---|---|---|---|
| 2011/0080894 A1* | 4/2011 | Iwamura et al. | 370/331 |
| 2011/0189997 A1* | 8/2011 | Tiwari et al. | 455/443 |
| 2011/0274046 A1* | 11/2011 | Rune et al. | 370/328 |

OTHER PUBLICATIONS

"Circuit Switched (CS) fallback in Evolved Packet System (EPS); Stage 2", 3GPP TS 23.272, V10.3.1 (Apr. 2011).

* cited by examiner

*Primary Examiner* — Rafael Pérez-Gutiérrez
*Assistant Examiner* — Suhail Khan
(74) *Attorney, Agent, or Firm* — Hoffmann & Baron, LLP

(57) ABSTRACT

A mobile telephone device includes: an instruction reception unit which, when a predetermined communication is transferred to a CDMA communication system, receives a handover instruction signal in the LTE communication system; a communication request unit which, when the signal is received, captures the CDMA communication system and requests a start of the communication; a communication processing unit which, when receiving an enabling signal for the request, performs communication in the CDMA communication system; and a storage unit which, when the enabling signal is not received, stores a combination of calling zones of both communication systems; wherein when a combination of a calling zone of the CDMA communication system newly captured in accordance with a new handover instruction and a calling zone in the LTE communication system matches with the stored combination, the communication request unit requests the start of the communication after performing a new location registration.

13 Claims, 7 Drawing Sheets

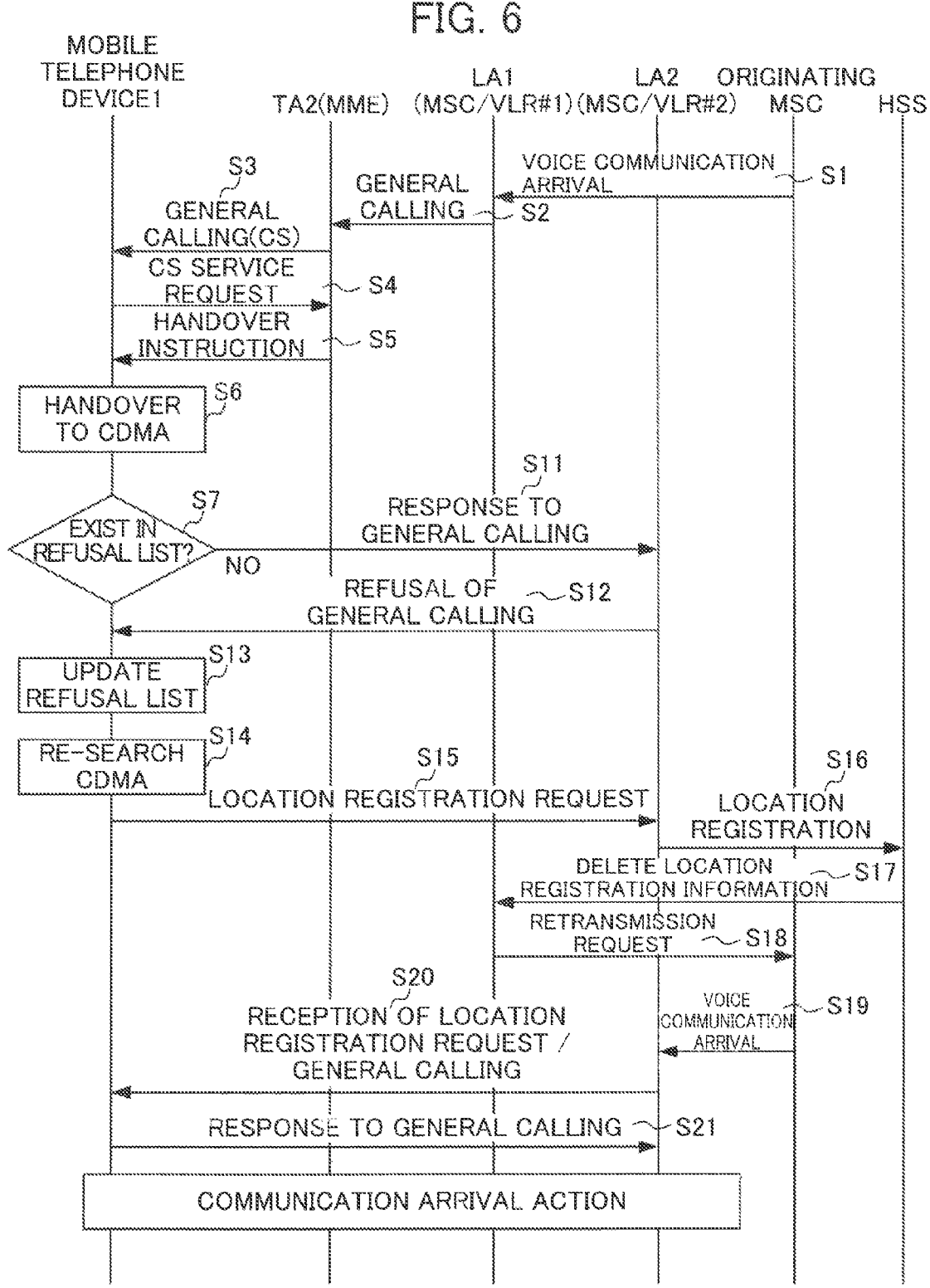

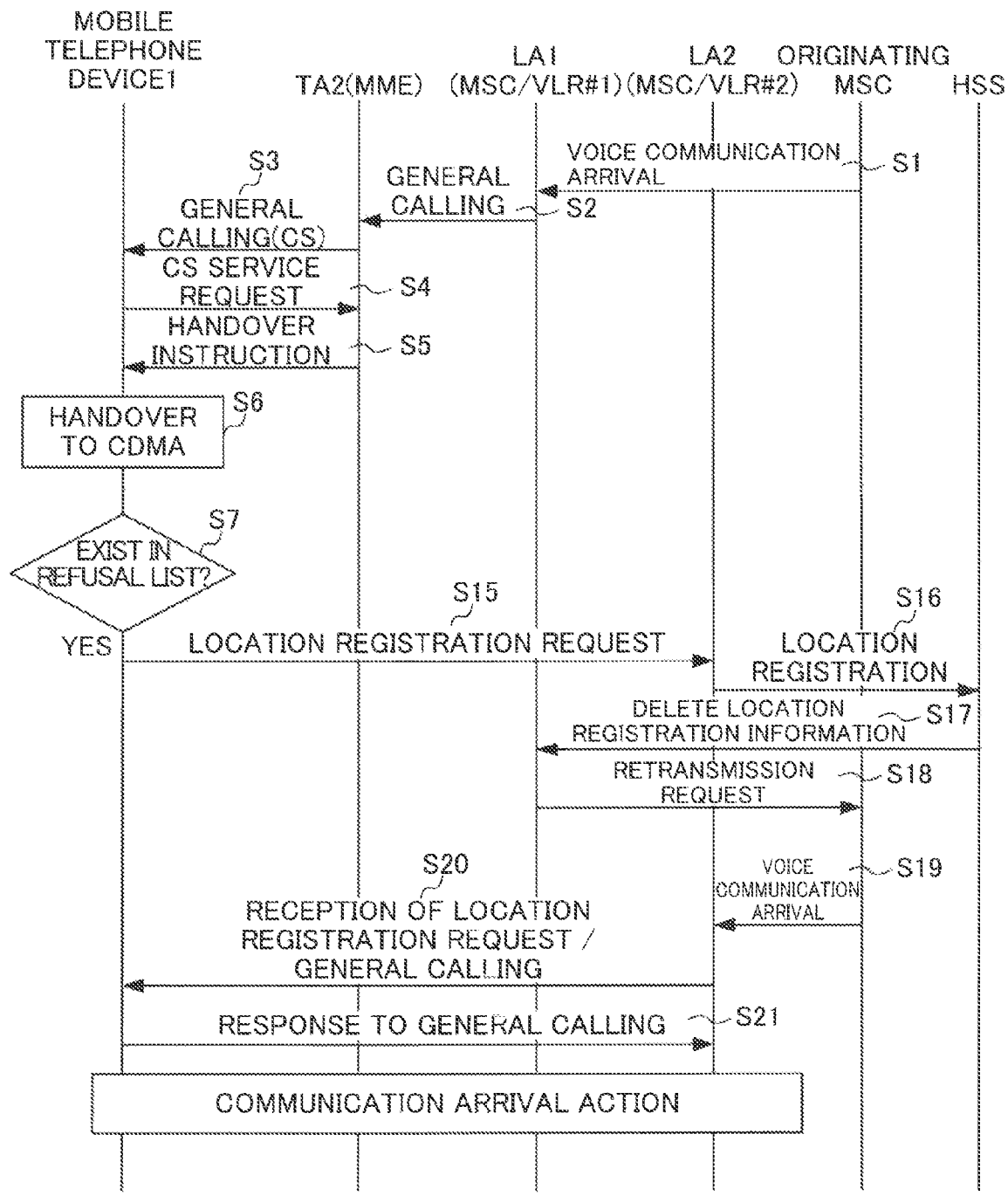

WIRELESS TERMINAL DEVICE TO SELECTIVELY SWITCH AMONG COMMUNICATION SYSTEMS TO PROVIDE OVERLAP FOR PERFORMING COMMUNICATION

This application is based on and claims the benefit of priority from Japanese Patent Application No. 2011-139309, filed on 23 Jun. 2011, the content of which is incorporated herein by reference.

BACKGROUND OF THE INVENTION

1. Field of the Invention

The present invention relates to a wireless terminal device and a communication method that selectively switch among a plurality of communication systems for performing communication.

2. Related Art

In recent years, LTE (Long Term Evolution) type communication systems have been introduced as communication systems used by wireless terminal devices such as a mobile telephone device, in addition to Circuit Switched (CS) type communication systems (for example, CDMA).

In addition, a CS-Fallback function has been defined in 3GPP TS 23.272. With this function, it is possible to notify in an LTE communication system an incoming call request from a CDMA communication system (For example, refer to 3GPP TS 23.272 V10.3.1, "Circuit Switched (CS) fallback in Evolved Packet System (EPS); Stage 2" 2011-04).

SUMMARY OF THE INVENTION

An object of the present invention is to provide a wireless terminal device and a communication method that can communicate more advantageously.

The wireless terminal device according to the present invention is a wireless terminal device that selectively switches among a plurality of communication systems provided so as to overlap with each other for performing communication, the wireless terminal device including: an instruction reception unit which, when a predetermined communication is produced in a state where a location registration is performed in a first communication system and the predetermined communication is transferred from the first communication system to a second communication system, receives a transfer instruction signal in the first communication system; a communication request unit which, when the transfer instruction signal is received by the instruction reception unit, captures the second communication system and requests a start of the predetermined communication to which the transfer is instructed, in the second communication system; a communication processing unit which, after the start of the predetermined communication is requested, when receiving in the second communication system an enabling signal for the request for the start of the predetermined communication, performs the predetermined communication in the second communication system; and a storage unit which, after the start of the predetermined communication is requested, when the enabling signal is not received in the second communication system, stores a combination of information on a communication area section in the second communication system when the enabling signal is not received, and information on a communication area section in the first communication system when the transfer instruction signal is received; wherein when a combination of information on a communication area section in the second communication system at a time when a new transfer instruction signal is received in the first communication system by the instruction reception unit and the second communication system is newly captured and information on a communication area section in the first communication system at a time when the new transfer instruction signal is received matches with the combination stored in the storage unit, the communication request unit requests to the second communication system the start of the communication to which the transfer is instructed, after newly performing a location registration in a communication area section of the newly captured second communication system.

In addition, it is preferable if the predetermined communication is communication of a type not supported in the first communication system but supported in the second communication system.

In addition, it is preferable if the first communication system is of an LTE type and the second communication system is of a CDMA type, and the transfer instruction of the predetermined communication complies with CS-Fallback function specified in 3GPP TS 23.272.

In addition, it is preferable if the first communication system is of a WiMAX type and the second communication system is of a CDMA type.

In addition, it is preferable if the predetermined communication is communication based on a notification of voice incoming call.

In addition, it is preferable if the predetermined communication is communication based on a notification of SMS incoming call.

In addition, it is preferable if the predetermined communication is communication based on a request of voice outgoing.

In addition, it is preferable if the predetermined communication is communication based on a request of SMS outgoing.

In addition, it is preferable if the instruction reception unit receives the transfer instruction signal from a control device of the first communication system, wherein the control device has knowledge of an overlapping relationship among control communication area sections of each of the first communication system and the second communication system.

In addition, it is preferable if the wireless terminal device according to the present invention further includes an acquisition unit for acquiring the combination to be stored in the storage unit from an external server.

In addition, it is preferable if the wireless terminal device according to the present invention further includes a transmission unit for transmitting to the server the combination stored in the storage unit.

In addition, it is preferable if the communication area section of each of the first communication system and the second communication system is a calling zone in the respective communication system.

The communication method according to the present invention is a communication method of a wireless terminal device that selectively switches among a plurality of communication systems provided so as to overlap with each other for performing communication, the method including: an instruction reception step in which, when a predetermined communication is produced in a state where a location registration is performed in a first communication system and the predetermined communication is transferred from the first communication system to a second communication system, a transfer instruction signal is received in the first communication system; a communication request step in which, when the transfer instruction signal is received in the instruction reception step, the second communication system is captured and a start of the predetermined communication to which the transfer is instructed is requested in the second communication system; a communication processing step in which, after the start of the predetermined communication is requested, when receiving in the second communication system an enabling signal for the request for the start of the predetermined communication, the predetermined communication is performed in the second communication system; and a storage step in which, after the start of the predetermined communication is requested, when the enabling signal is not received in the second communication system, a combination of information on a communication area section in the second communication system when the enabling signal is not received, and information on a communication area section in the first communication system when the transfer instruction signal is received is stored; wherein when a combination of information on a communication area section in the second communication system at a time when a new transfer instruction signal is received in the first communication system in the instruction reception step and the second communication system is newly captured and information on a communication area section in the first communication system at a time when the new transfer instruction signal is received matches with the combination stored in the storage step, the start of the communication to which the transfer is instructed is requested to the second communication system in the communication request step, after newly performing a location registration in a communication area section of the newly captured second communication system.

The wireless terminal device according to the present invention is a wireless terminal device which, when receiving by a first communication system incoming call in a second communication system, transmits a response to the incoming call by switching from the first communication system to the second communication system, wherein if a combination of a location area in the first communication system before the switching and a location area in the second communication system after the switching meets a predetermined condition, the wireless terminal device does not transmit the response to the incoming call.

According to the present invention, the wireless terminal device can communicate more advantageously.

BRIEF DESCRIPTION OF THE DRAWINGS

FIG. 6 is a sequence diagram showing processing in a case where a calling zone of a handover target is different from the mapping data and a combination of the calling zones is not registered in the refusal list in the mobile telephone device according to the embodiment of the present invention; and FIG. 7 is a sequence diagram showing processing in a case where a calling zone of a handover target is different from the mapping data and a combination of the calling zones is registered in the refusal list in the mobile telephone device according to the embodiment of the present invention.

DETAILED DESCRIPTION OF THE INVENTION

Hereafter, an example of a preferred embodiment of the present invention will be described. It should be noted that, a mobile telephone device 1 will be described as an example of a wireless terminal device in the present embodiment.

Figure 1:
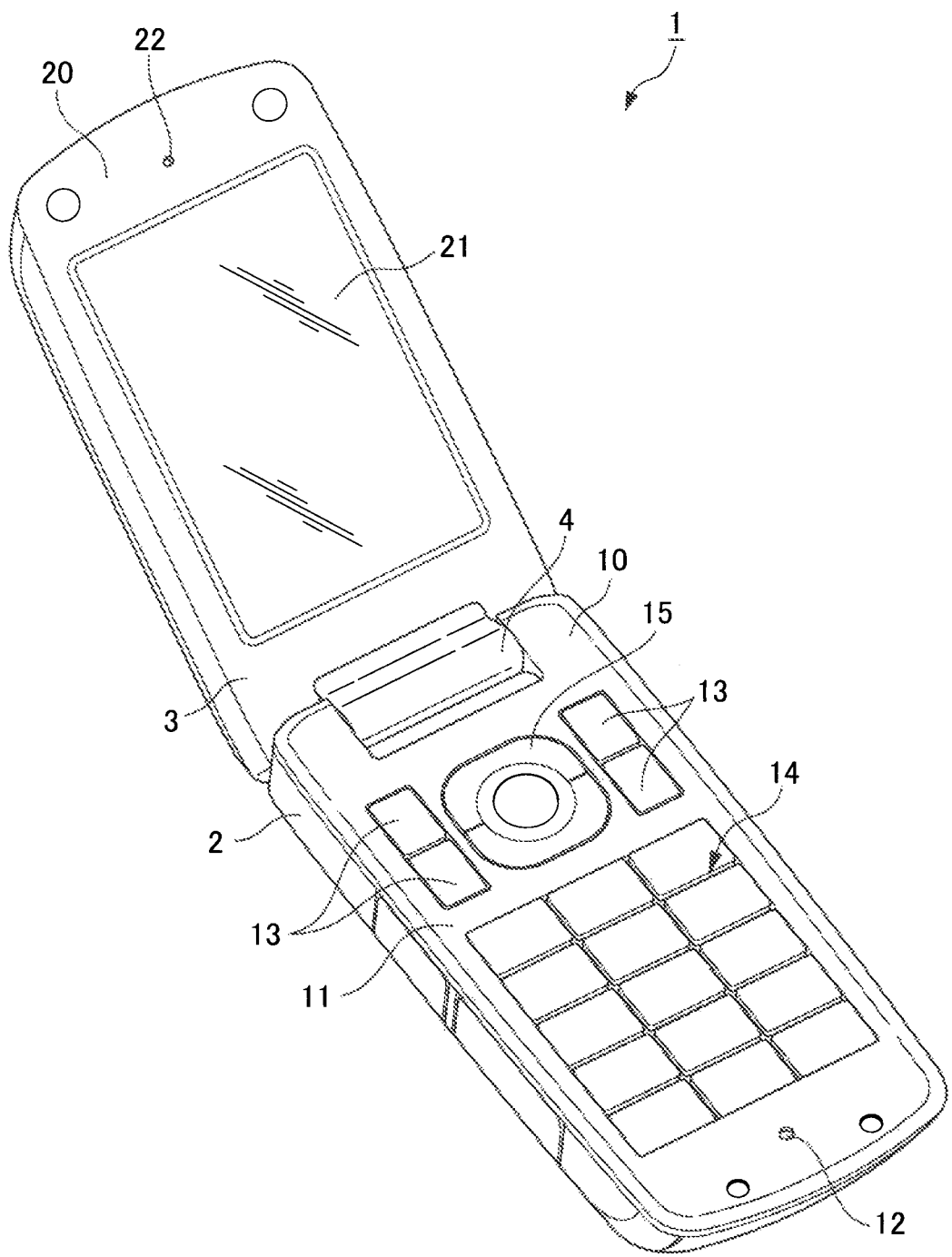
FIG. 1 is an external perspective view of a mobile telephone device according to an embodiment of the present invention.

FIG. 1 is an external perspective view of the mobile telephone device 1 according to the present embodiment.

It should be noted that, although FIG. 1 shows an embodiment of a so-called folder type mobile telephone device, the embodiment of the mobile telephone device according to the present invention is not limited thereto. For example, the mobile telephone device may be of: a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion.

The mobile telephone device 1 includes the operation unit side body 2 and the display unit side body 3. The operation unit side body 2 is configured to include, on a surface portion 10 thereof, an operation unit 11 and a microphone 12 to which sound produced by a user of the mobile telephone device 1 is input when the user is having a conversation or using a speech recognition application. The operation unit 11 is configured to include: function setting operation buttons 13 for activating various functions, such as various setting functions, a phonebook function, and an e-mail function; input operation buttons 14 for inputting digits of a telephone number, characters for an e-mail, or the like; and a determination operation button 15 for performing determinations in various operations, scrolling, or the like.

In addition, the display unit side body 3 is configured to include, on the surface portion 20: a display unit 21 for displaying a variety of information; and a receiver 22 for outputting voice of the other party of the conversation.

In addition, an upper end of the operation unit side body 2 and a lower end of the display unit side body 3 are interconnected via a hinge mechanism 4. Furthermore, by rotating the operation unit side body 2 and the display unit side body 3 relatively to each other, which are interconnected via the hinge mechanism 4, the mobile telephone device 1 can be in a state where the operation unit side body 2 and the display unit side body 3 are opened with respect to each other (opened state), and a state where the operation unit side body 2 and the display unit side body 3 are folded together (closed state).

Figure 2:
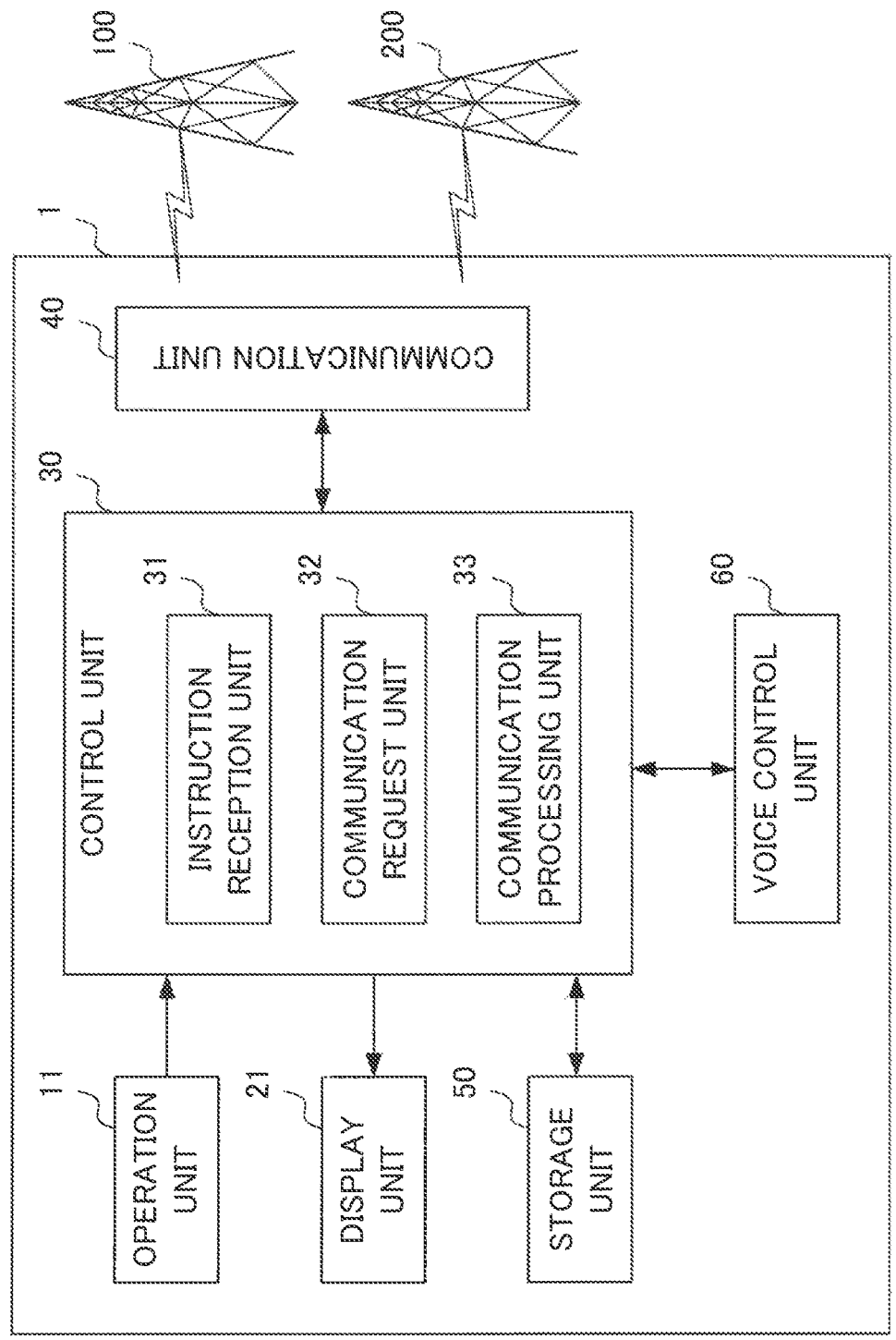
FIG. 2 is a block diagram showing functions of the mobile telephone device according to the embodiment of the present invention.

FIG. 2 is a block diagram showing functions of the mobile telephone device 1 according to the present embodiment.

The mobile telephone device 1 includes the operation unit 11, the display unit 21, the control unit 30, the communication unit 40, the storage unit 50, and the voice control unit 60.

The control unit 30 controls the entire mobile telephone device 1, and for example, performs predetermined control over units such as the display unit 21 and the communication unit 40. In addition, the control unit 30 executes a variety of processing by receiving inputs from the operation unit 11, the communication unit 40, or the like. Moreover, upon executing the processing, the control unit 30 controls the storage unit 50, and reads various programs and data and writes data. It should be noted that the detailed functions of the control unit 30 according to the present embodiment will be described later.

The communication unit 40 communicates with an external device (a base station 100 of the LTE communication system or a base station 200 of the CDMA communication system) using a predetermined utilizing frequency band (for example, 2 GHz band and 800 MHz band). Moreover, the communication unit 40 demodulates a signal received from an antenna and supplies the signal thus processed to the control unit 30, and furthermore modulates the signal supplied from the control unit 30 and transmits the signal from the antenna to the external device.

Here, in the present embodiment, since the communication unit 40 conforms to both W-CDMA or CDMA2000_1x, which is a communication protocol for voice and data communications (hereinafter "CDMA"), and LTE, which is a communication protocol mainly used for high speed data communication, it is possible to communicate with a communication system of either one of the protocols. The communication unit 40 communicates with the base station with any one of the protocols by selectively switching among a plurality of communication systems, which provide mutually overlapping communication areas (location areas) based on an instruction from the control unit 30. It should be noted that, the mobile telephone device 1 gives priority to communication using an LTE communication system of an LTE standard (first communication system) at the time of data communication, and switches to communication using a CDMA communication system of a CDMA standard (second communication system) at the time of a voice call or transmission and reception of SMS.

The storage unit 50 includes a working memory, for example, and is used for arithmetic processing by the control unit 30. In addition, the storage unit 50 stores various programs and the like in accordance with the present embodiment. Furthermore, the storage unit 50 stores a refusal list including a combination of information of a calling zone (communication area (location area) section) in the LTE communication system, which will be described later, and information of a calling zone in the CDMA communication system.

The voice control unit 60 performs predetermined voice processing on a signal supplied from the communication unit 40 according to the control of the control unit 30, and outputs to the receiver 22 the signal thus processed. The receiver 22 externally outputs the signal transmitted from the voice control unit 60. It should be noted that this signal may be outputted from a loudspeaker, in place of the receiver 22 or in addition to the receiver 22. In addition, the voice control unit 60 processes the signal inputted from the microphone 12 according to the control of the control unit 30, and outputs to the communication unit 40 the signal thus processed. The communication unit 40 performs predetermined processing on a signal transmitted from the voice control unit 60 and outputs the signal thus processed from the antenna.

Next, the function of the control unit 30 will be described in detail.

The mobile telephone device 1 and the control device of each communication system have the CS-Fallback function, in order to transfer the communication from the LTE communication system to the CDMA communication system. Accordingly, an MME (Mobility Management Entity), which is a control device of the LTE communication system, stores mapping data that indicates a corresponding relationship of physical overlap between the calling zones in the LTE communication system and calling zones in the CDMA communication system.

Here, in order to implement the CS-Fallback function, it is necessary to recognize in which calling zone in the CDMA communication system the mobile telephone device 1 that is in a standby state in the LTE communication system is physically located. For this reason, upon the mobile telephone device 1 performing a location registration request in the LTE communication system, the MME of the LTE communication system requests a location registration (coordinated location registration) to the calling zone of the CDMA communication system that has an area overlapping with the calling zone of the LTE communication system. At this time, information on which calling zone of the CDMA communication system the calling zone of the LTE communication system is in an overlapping relationship is acquired from the mapping data, which is prepared in advance. When a location registration request is received from the LTE communication system, an MSC (Mobile Switching Center)/VLR (Visited Location Register), which is a control device of the CDMA communication system, updates location registration information and replies a response to the LTE communication system.

Figure 3:
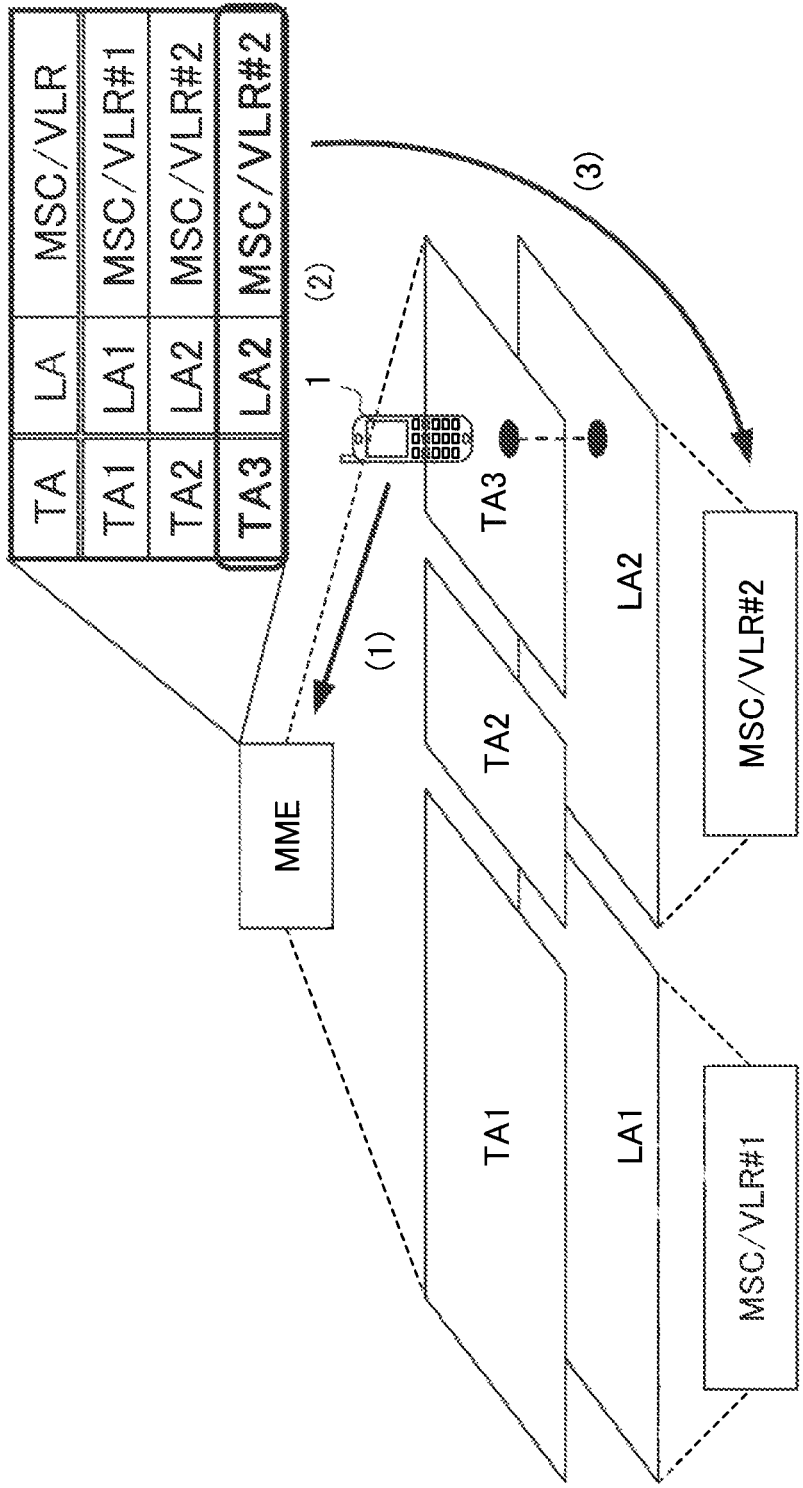
FIG. 3 is a diagram showing procedures of a coordinated location registration according to the embodiment of the present invention.

FIG. 3 is a diagram showing procedures of a coordinated location registration according to the present embodiment.

The MME, which is a control device of the LTE system, manages three calling zones (TA1, TA2 and TA3). Moreover, an MSC/VLR #1 and an MSC/VLR #2, which are control devices of the CDMA communication system, manage calling zones LA1 and LA2, respectively.

In addition, the MME stores a corresponding relationship between TA1 and LA1, and a corresponding relationship between TA2/TA3 and LA2, as mapping data in a mapping table.

First, the control unit 30 of the mobile telephone device 1 located in the calling zone TA3 in the LTE communication system performs location registration processing for the MME (1). Based on the mapping table, the MME identifies the calling zone LA2 of the CDMA communication system, in which the calling zone LA2 physically overlaps with the calling zone TA3 (2). In addition, the MME performs a coordinated location registration request for the MSC/VLR #2 that manages the calling zone LA2 (3). When receiving this request, the MSC/VLR #2 performs location registration processing, and stores information that the mobile telephone device 1 is located in the calling zone TA3 of the LTE communication system.

As a result of performing the coordinated location registration, incoming call in the CDMA communication system is notified to the MSC/VLR #2, and incoming call is notified from the MSC/VLR #2 to the MME.

In addition, the control unit 30 of the mobile telephone device 1 includes an instruction reception unit 31, a communication request unit 32, and a communication processing unit 33.

When the communication is transferred from the LTE communication system to the CDMA communication system, in cases such as where there is a voice incoming call or voice outgoing, the instruction reception unit 31 receives a transfer instruction from the LTE communication system, that is, the instruction reception unit 31 receives an instruction signal of handover to the CDMA communication system, by way of the CS-Fallback function. It should be noted that, the instruction reception unit 31 receives a transfer instruction from the LTE communication system, that is, the instruction reception unit 31 receives an instruction signal of handover to the CDMA communication system, by way of the CS-Fallback function, not only in case of the voice communication but also in cases where there is incoming call or outgoing of an SMS (short messaging service), which uses outgoing and incoming call sequences partly in common with the voice communication.

When a handover instruction signal is received by the instruction reception unit 31, the communication request unit 32 captures the CDMA communication system and request to the captured CDMA communication system a start of the communication to which a transfer is instructed.

Thus, although the communication request unit 32 performs reply processing by performing handover from the LTE communication system to the CDMA communication system in accordance with, for example, incoming call notification, the handover is not necessarily performed to the calling zone that matches with the mapping data if the actual overlap between the calling zones is not a one-to-one relationship indicated in the mapping data.

Figure 4:
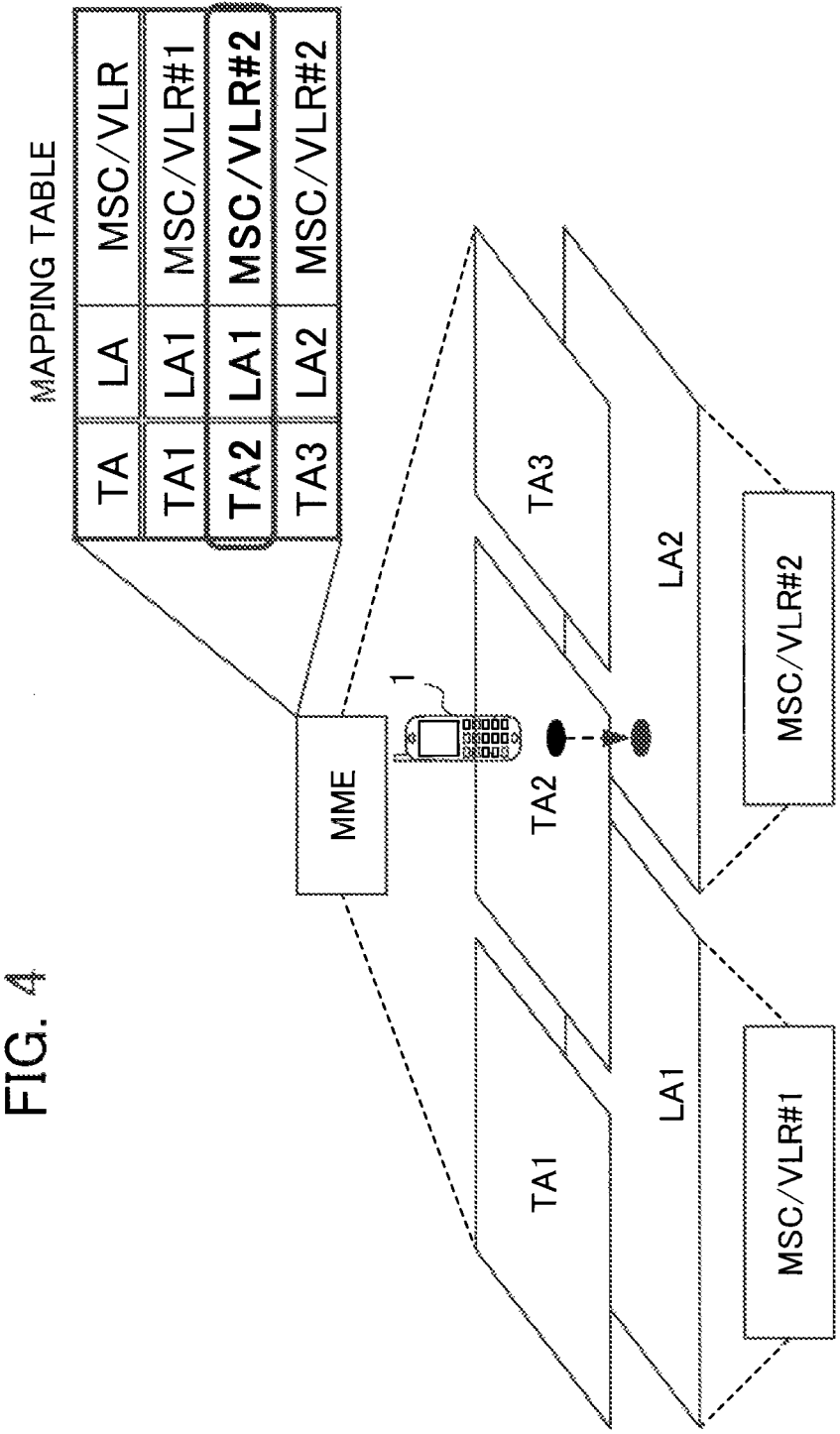
FIG. 4 is a diagram showing an example of a case where the mobile telephone device according to the embodiment of the present invention has performed handover to a calling zone that is different from the mapping data.

FIG. 4 is a diagram showing an example in a case where the mobile telephone device 1 according to the present embodiment performs handover to a calling zone that is different from the mapping data.

In this example, the mobile telephone device 1 has performed location registration to the calling zone TA2 of the LTE communication system, and has performed coordinated location registration according to the mapping table to the corresponding calling zone LA1 of the CDMA communication system as well.

At this time, when located in a location physically overlapping with the calling zone LA2, the mobile telephone device 1 synchronizes with the calling zone LA2 when there is handover to the CDMA communication system by way of the CS-Fallback function, according to the incoming call notified to the calling zone LA1. Then, since the calling zone LA2 is different from the calling zone LA1 (MSC/VLR #1) in which the coordinated location registration has been performed, the MSC/VLR #2 notifies an incoming call refusal in response to the incoming call response. Accordingly, after newly performing location registration processing to the calling zone LA2, the control unit 30 of the mobile telephone device 1 performs an incoming call response again.

Meanwhile, when a combination of information on the calling zone of the captured CDMA communication system and information on the calling zone in the LTE communication system at the time when the handover instruction signal is received is stored in the refusal list in the storage unit 50, the communication request unit 32 newly performs a location registration to the captured CDMA communication system and requests to the CDMA communication system a start of the communication.

Here, the refusal list is updated when an enabling signal is not received after a start of communication is requested by the communication request unit 32. That is, the refusal list stores a combination of information on the calling zone in the CDMA communication system that has not received the enabling signal and information on the calling zone in the LTE communication system at the time when a handover instruction signal is received.

When receiving an enabling signal of the communication after the start of the communication is requested by the communication request unit 32, the communication processing unit 33 performs the communication to which transfer is instructed in the CDMA communication system via the communication unit 40.

Figure 5:
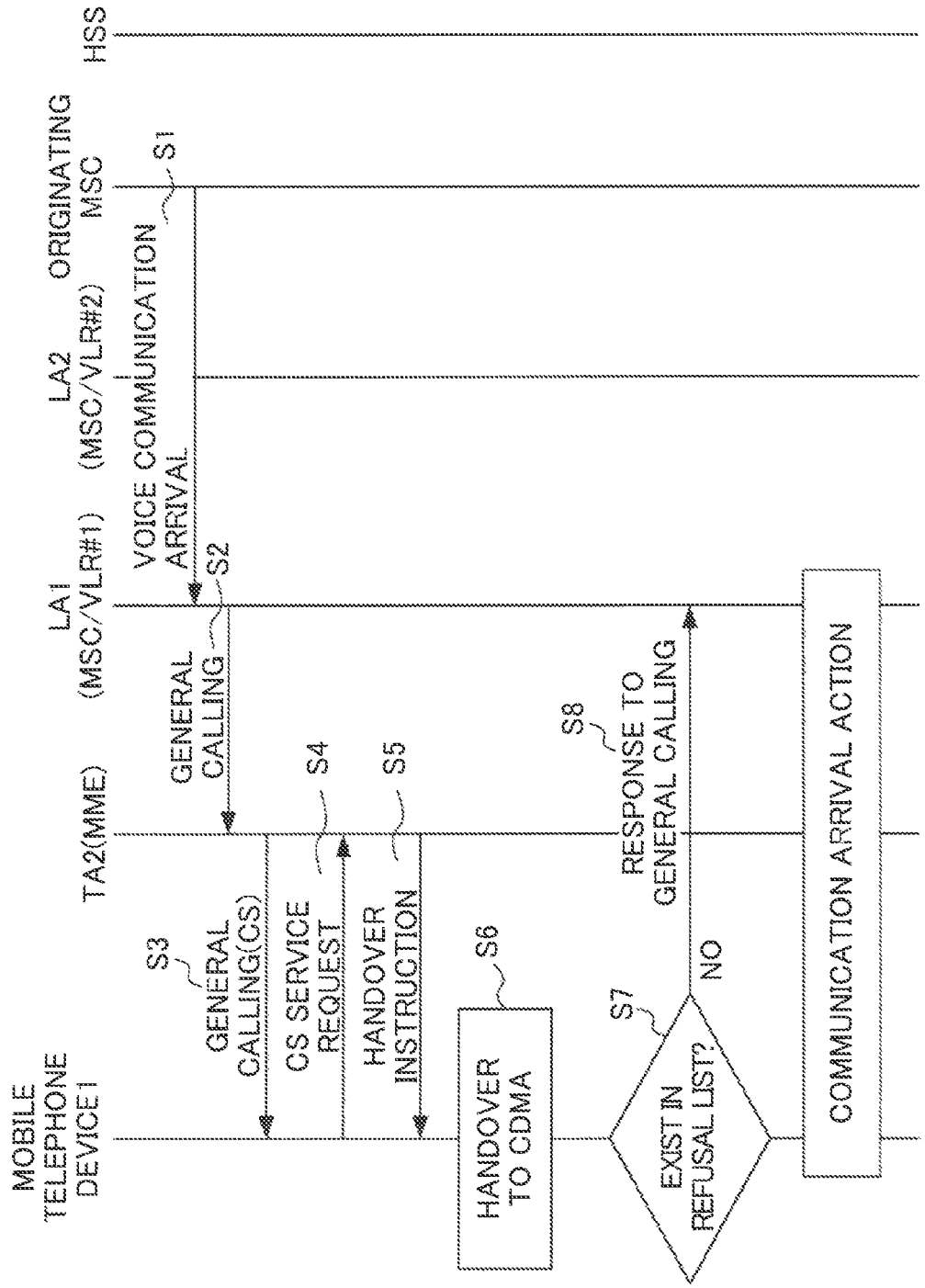
FIG. 5 is a sequence diagram showing processing in a case where a calling zone of a handover target matches with the mapping data in the mobile telephone device according to the embodiment of the present invention.

FIG. 5 is a sequence diagram showing processing in a case where the calling zone of the handover target matches with the mapping data at the time of incoming call of the voice or SMS in the mobile telephone device 1 according to the present embodiment.

It should be noted that, the mobile telephone device 1 is in a communicative standby state at a location in the calling zone TA2 in the LTE communication system and the calling zone LA1 in the CDMA communication system in an environment where the calling zones are overlapped as shown in FIG. 4.

In Step S1, the MSC/VLR #1 that manages the calling zone LA1, which is a location registering destination of the mobile telephone device 1, receives an incoming call notice from the originating MSC.

In Step S2, the MSC/VLR #1 performs a general calling to the MME that manages the calling zone TA2 that is associated by the mapping data.

In Step S3, the MME performs a general calling to the mobile telephone device 1 in the calling zone TA2.

In Step S4, the mobile telephone device 1, which received the general calling, requests to the MME a CS service of a voice call or SMS.

In Step S5, the MME instructs to the mobile telephone device 1 handover to the CDMA communication system, which supports the voice call or SMS.

In Step S6, the mobile telephone device 1 searches for a CDMA communication system and performs the handover to the base station captured in the calling zone LA1.

In Step S7, the mobile telephone device 1 determines whether or not a combination of the calling zone TA2 in the LTE communication system when the handover instruction is received and the calling zone LA1 in the CDMA communication system, which is the handover target, is included in the refusal list. In this example, since the calling zone LA1 of the handover target, matches with the mapping data, the determination is NO.

In Step S8, the mobile telephone device 1 transmits a response to the general calling to the MSC/VLR #1 of the calling zone LA1. Then, a normal incoming call action of voice or SMS is performed in the mobile telephone device 1 and the MSC/VLR #1.

FIG. 6 is a sequence diagram showing processing in a case where the calling zone of the handover target is different from the mapping data and a combination of the calling zones is not registered in the refusal list, at a time of incoming call of voice or SMS in the mobile telephone device 1 according to the present embodiment.

It should be noted that the mobile telephone device 1 is in a communication standby state at a location in the calling zone TA2 in the LTE communication system and the calling zone LA2 in the CDMA communication system, in an environment where the calling zones are overlapped as in FIG. 4.

In Steps S1-S5, similar to the example in FIG. 5, the mobile telephone device 1 receives a handover instruction in response to a CS service request, when receiving a general calling that corresponds to the voice incoming call, via the MSC/VLR #1, which is the coordinated location registering destination, of the calling zone LA1, and the MME of the calling zone TA2.

In Step S6, the mobile telephone device 1 searches for a CDMA communication system and performs handover to the captured base station in the calling zone LA2 that is different from the mapping data.

In Step S7, the mobile telephone device 1 determines whether or not a combination of the calling zone TA2 in the LTE communication system when the handover instruction is received and the calling zone LA2 in the CDMA communication system, which is the handover target, is included in the refusal list. In this example, the mobile telephone device 1 performs the handover from TA2 to LA2 at the first time and since this combination is not registered in the refusal list, the determination is NO.

In Step S11, the mobile telephone device 1 transmits a response to the general calling to the MSC/VLR #2 in the calling zone LA2.

In Step S12, the MSC/VLR #2 notifies refusal of general calling in response to the response to the general calling in Step S11 from the mobile telephone device 1 that itself has not transmitted a general calling signal.

In Step S13, in response to receiving the refusal of general calling in Step S12, the mobile telephone device 1 adds a combination of the calling zone TA2 and the calling zone LA2 in the refusal list and updates the refusal list.

In Step S14, the mobile telephone device 1 determines that the handover to the CDMA communication system has failed, and after once returning to a communication standby state, searches for a CDMA communication system again and performs handover to the captured base station in the calling zone LA2.

In Step S15, the mobile telephone device 1 transmits a location registration request to the MSC/VLR #2 in order to perform a location registration in the handover target.

In Step S16, the MSC/VLR #2 requests a location registration to an HSS (Home Subscriber Server), which manages registration information of subscribers.

In Step S17, the HSS deletes location registration information in the calling zone LA1 by instructing the MSC/VLR #1 in which a coordinated location registration has been performed.

In Step S18, the MSC/VLR #1 transmits to the originating MSC a retransmission request of incoming voice or SMS communication, triggered by deletion of the location registration information in Step S17.

In Step S19, the MSC/VLR #2 that manages the calling zone LA2, which is the location registering destination of the mobile telephone device 1, receives a notification of a voice incoming call from the originating MSC.

In Step S20, the MSC/VLR #2 replies to the mobile telephone device 1 a location registration request reception as a conformation to the location registration request in Step S15 and performs a general calling of incoming voice or SMS communication as well.

In Step S21, the mobile telephone device 1 transmits a response to the general calling to the MSC/VLR #2 of the calling zone LA2. Then, a normal incoming call action of voice or SMS is performed in the mobile telephone device 1 and the MSC/VLR #2.

FIG. 7 is a sequence diagram showing processing in a case where the calling zone of a handover target is different from the mapping data and a combination of the calling zones is registered in the refusal list at the time of incoming call of voice or SMS in the mobile telephone device 1 according to the present embodiment.

It should be noted that the mobile telephone device 1 is in a communication standby state at a location in the calling zone TA2 in the LTE communication system and the calling zone LA2 in the CDMA communication system, in an environment where the calling zones are overlapped as shown in FIG. 4.

In Steps S1-S6, as in the example in FIG. 6, when receiving a general calling corresponding to incoming voice communication via the MSC/VLR #1 of the calling zone LA1 which is the cooperation location registering destination and the MME of the calling zone TA2, the mobile telephone device 1 receives a handover instruction in response to a CS service request. Then, the mobile telephone device 1 searches for a CDMA communication system, and performs handover to the captured base station in the calling zone LA2, which is different from the mapping data.

In Step S7, the mobile telephone device 1 determines whether or not a combination of the calling zone TA2 in the LTE communication system when the handover instruction is received and the calling zone LA2 in the CDMA communication system, which is the handover target, is included in the refusal list. In this example, since the mobile telephone device 1 has already experienced the handover from TA2 to LA2 and the combination of the calling zones is registered in the refusal list, the determination is YES.

Hereafter, in Steps S15-S21, as in the example in FIG. 6, after performing a location registration in the calling zone LA2, the mobile telephone device 1 transmits a response to the general calling, and a normal incoming call action of voice or SMS is performed in the mobile telephone device 1 and the MSC/VLR #2.

With this processing, as compared with the example in FIG. 6, Steps S11-S14 can be omitted and the time until transferring to the incoming call action can be shortened.

As described above, in according to the present embodiment, after registering the combination of the calling zones into the refusal list in response to a refusal of general calling, the mobile telephone device 1 can omit unnecessary response and processing for re-searching when there is handover of the same combination. Therefore, in addition to shortening the time until transferring to the voice call or SMS reception, the mobile telephone device 1 can suppress waste of the resources during this period and reduce power consumption. As a result, it is possible to avoid inconveniences relating to the switching between the communication systems and the mobile telephone device 1 can communicate more advantageously.

Although the embodiment of the present invention has been described in the above, the present invention is not limited to the embodiment described above. In addition, the effects described for the embodiment of the present invention are merely a result of exemplifying effects arising from the present invention, and the effects of the present invention are not limited to those described for the embodiment of the present invention.

Although communication based on the voice incoming call notification or SMS reception notification has been described as an example, the present invention is not limited thereto. The present invention is also applicable to communication based on a voice outgoing request (CS service request) or an SMS outgoing request. In addition, the present invention is not limited to voice communication or SMS and is good as long as it is communication of a type not supported in a first communication system but supported in a second communication system.

In addition, the first communication system is not limited to that of an LTE type, and may be of, a WiMAX type or the like as long as it is a type of communication that does not have a routine of outgoing and incoming call of voice or a routine of SMS transmission and reception, and the present invention is applicable as long as a function corresponding to CS-Fallback can be implemented.

In addition, the refusal list stored in the mobile telephone device 1 may be configured so as to be capable of being acquired from a predetermined server that accumulates combinations of the calling zones where the general calling refusal is produced. By having an acquisition unit for acquiring the refusal list from the server, the mobile telephone device 1 can store the combination of the calling zones, that has not been experienced by the mobile telephone device 1 yet, and therefore, it is possible to improve efficiency of processing in a calling zone where a location registration is performed for the first time.

Furthermore, by having a transmission unit for transmitting the refusal list to the server, the server can collect from a plurality of terminals the combination of the calling zones where the general calling refusal is produced and provide the combination to each terminal. Thus, the refusal list is generated efficiently.

In addition, the wireless terminal device according to the present invention is not limited to a mobile telephone device 1. The present invention is applicable to various devices, such as a PHS (trademark: Personal Handyphone System), a PDA (Personal Digital Assistant), a gaming device, a navigation device, a personal computer, and a communication-dedicated module specialized in communication functions.

What is claimed is:

1. A wireless terminal device that selectively switches among a plurality of communication systems provided so as to overlap with each other for performing communication, the wireless terminal device comprising:
   an instruction reception unit which, when a predetermined communication is produced in a state where a location registration is performed in a first communication system and the predetermined communication is transferred from the first communication system to a second communication system, receives a transfer instruction signal in the first communication system;
   a communication request unit which, when the transfer instruction signal is received by the instruction reception unit, captures the second communication system and requests a start of the predetermined communication to which the transfer is instructed, in the second communication system;
   a communication processing unit which, after the start of the predetermined communication is requested, when receiving in the second communication system an enabling signal for the request for the start of the predetermined communication, performs the predetermined communication in the second communication system; and
   a storage unit which, after the start of the predetermined communication is requested, when the enabling signal is not received in the second communication system, stores a combination of information on a communication area section in the second communication system when the enabling signal is not received, and information on a communication area section in the first communication system when the transfer instruction signal is received; wherein
   when a combination of information on a communication area section in the second communication system at a time when a new transfer instruction signal is received in the first communication system by the instruction reception unit and the second communication system is newly captured and information on a communication area section in the first communication system at a time when the new transfer instruction signal is received matches with the combination stored in the storage unit, the communication request unit requests to the second communication system the start of the communication to which the transfer is instructed, after newly performing a location registration in a communication area section of the newly captured second communication system.

2. The wireless terminal device according to claim 1, wherein
   the predetermined communication is communication of a type not supported in the first communication system but supported in the second communication system.

3. The wireless terminal device according to claim 1, wherein
   the first communication system is of an LTE type and the second communication system is of a CDMA type, and
   the transfer instruction of the predetermined communication complies with CS-Fallback function specified in 3GPP TS 23.272 V10.3.1.

4. The wireless terminal device according to claim 1, wherein
   the first communication system is of a WiMAX type and the second communication system is of a CDMA type.

5. The wireless terminal device according to claim 3, wherein
   the predetermined communication is communication based on a notification of incoming voice call.

6. The wireless terminal device according to claim 3, wherein
   the predetermined communication is communication based on a notification of SMS.

7. The wireless terminal device according to claim 3, wherein
   the predetermined communication is communication based on a request of voice outgoing.

8. The wireless terminal device according to claim 3, wherein
   the predetermined communication is communication based on a request of SMS outgoing.

9. The wireless terminal device according to claim 1, wherein
   the instruction reception unit receives the transfer instruction signal from a control device of the first communication system, wherein the control device has knowledge of an overlapping relationship among control communication area sections of each of the first communication system and the second communication system.

10. The wireless terminal device according to claim 1, further comprising
    an acquisition unit for acquiring the combination to be stored in the storage unit from an external server.

11. The wireless terminal device according to claim 10, further comprising
    a transmission unit for transmitting to the server the combination stored in the storage unit.

12. The wireless terminal device according to claim 1, wherein
    the communication area section of each of the first communication system and the second communication system is a calling zone in the respective communication system.

13. A communication method of a wireless terminal device that selectively switches among a plurality of communication systems provided so as to overlap with each other for performing communication, the method comprising:
    an instruction reception step in which, when a predetermined communication is produced in a state where a location registration is performed in a first communication system and the predetermined communication is transferred from the first communication system to a second communication system, a transfer instruction signal is received in the first communication system;
    a communication request step in which, when the transfer instruction signal is received in the instruction reception step, the second communication system is captured and a start of the predetermined communication to which the transfer is instructed is requested in the second communication system;
    a communication processing step in which, after the start of the predetermined communication is requested, when receiving in the second communication system an enabling signal for the request for the start of the predetermined communication, the predetermined communication is performed in the second communication system; and
    a storage step in which, after the start of the predetermined communication is requested, when the enabling signal is not received in the second communication system, a combination of information on a communication area section in the second communication system when the enabling signal is not received, and information on a communication area section in the first communication system when the transfer instruction signal is received is stored; wherein when a combination of information on a communication area section in the second communication system at a time when a new transfer instruction signal is received in the first communication system in the instruction reception step and the second communication system is newly captured and information on a communication area section in the first communication system at a time when the new transfer instruction signal is received matches with the combination stored in the storage step, the start of the communication to which the transfer is instructed is requested to the second communication system in the communication request step, after newly performing a location registration in a communication area section of the newly captured second communication system.

* * * * *